US012470588B2

(12) United States Patent
Das et al.

(10) Patent No.: US 12,470,588 B2
(45) Date of Patent: Nov. 11, 2025

(54) SOFTWARE BILL OF MATERIALS AND VULNERABILITY MANAGEMENT VIA DEEP PACKET INSPECTION (71) Applicant: Palo Alto Networks, Inc., Santa Clara, CA (US)

(72) Inventors: Aveek Kumar Das, Berkeley, CA (US); Dylan Stewart Spagnuolo, Santa Clara, CA (US); Sultanbek Omurzakov, Los Gatos, CA (US); Gong Cheng, Sunnyvale, CA (US); Mei Wang, Saratoga, CA (US); Jianlin Zeng, Saratoga, CA (US); Xu Zou, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 186 days.

(21) Appl. No.: 18/356,446

(22) Filed: Jul. 21, 2023

(65) Prior Publication Data

US 2025/0030719 A1 Jan. 23, 2025

(51) Int. Cl.
H04L 9/40 (2022.01)
(52) U.S. Cl.
CPC ...... *H04L 63/1433* (2013.01); *H04L 63/1425* (2013.01)
(58) Field of Classification Search
CPC .................. H04L 63/1433; H04L 63/1425
See application file for complete search history.

(56) References Cited

U.S. PATENT DOCUMENTS

| 8,762,412 | B2 * | 6/2014 | Lim ...................... G06F 16/176 |
| | | | 709/229 |
| 10,789,357 | B2 * | 9/2020 | Wang ................ G06F 16/24568 |
| 11,146,617 | B1 * | 10/2021 | Kangas ............... H04L 63/0245 |
| 11,277,429 | B2 * | 3/2022 | Ababtain ............ H04L 63/1425 |
| 11,841,945 | B1 * | 12/2023 | Fogel ...................... G06F 21/53 |
| 11,875,306 | B1 * | 1/2024 | Shalev .................... G06F 21/57 |
| 11,985,152 | B1 * | 5/2024 | Dashevskiy ........ H04L 63/1425 |
| 12,088,615 | B2 * | 9/2024 | Sundaram ........... H04L 63/0876 |
| 2014/0181968 | A1 * | 6/2014 | Ge ...................... H04L 63/1416 |
| | | | 726/23 |
| 2017/0187734 | A1 * | 6/2017 | Lee ..................... H04L 63/1425 |
| 2017/0195344 | A1 * | 7/2017 | Astigarraga .......... H04L 41/142 |

(Continued)

FOREIGN PATENT DOCUMENTS

| CN | 104041095 B | * | 5/2018 | ......... H04L 63/0245 |
| CN | 109617910 A | * | 4/2019 | ......... H04L 63/1433 |

(Continued)

*Primary Examiner* — Sarah Su
(74) *Attorney, Agent, or Firm* — Gilliam IP PLLC (57) ABSTRACT A software bill of materials (SBOM) and vulnerability management system ("system") disclosed herein extracts software component-related identifiers for Internet of Things (IoT) devices using deep packet inspection. The system filters the identifiers by removing identifiers that match a blacklist of identifiers known to not correspond to software components. The system then populates SBOM fields using a database storing the filtered identifiers with a schema that is uniform across SBOM file formats and queries a vulnerability database with software components indicated in the filtered identifiers to identify vulnerabilities for each IoT device for security risk assessment.

20 Claims, 7 Drawing Sheets (56) References Cited

U.S. PATENT DOCUMENTS

| | | | |
|---|---|---|---|
| 2019/0356697 A1* | 11/2019 | Chougule | G06F 9/45558 |
| 2020/0204576 A1* | 6/2020 | Davis | H04L 63/20 |
| 2020/0389426 A1* | 12/2020 | Enguehard | H04L 63/102 |
| 2021/0192057 A1* | 6/2021 | Helfman | G06F 21/577 |
| 2021/0194916 A1* | 6/2021 | Drake | H04L 63/1433 |
| 2021/0203694 A1* | 7/2021 | Paquet | H04L 63/1483 |
| 2021/0211442 A1* | 7/2021 | Haga | H04L 63/1425 |
| 2022/0141254 A1* | 5/2022 | Oswal | H04L 63/1408 |
| | | | 726/1 |
| 2022/0232040 A1* | 7/2022 | Crabtree | H04L 63/20 |
| 2024/0179170 A1* | 5/2024 | Bandos | H04L 63/1475 |
| 2025/0055870 A1* | 2/2025 | Viswambharan | H04L 63/08 |

FOREIGN PATENT DOCUMENTS

| | | | | |
|---|---|---|---|---|
| CN | 110032509 A | * | 7/2019 | G06F 11/368 |
| CN | 110659038 A | * | 1/2020 | G06F 8/71 |
| CN | 113706100 A | * | 11/2021 | G06F 18/22 |
| CN | 115905895 A | * | 4/2023 | |
| CN | 115981718 A | * | 4/2023 | |
| CN | 117278353 A | * | 12/2023 | H04L 12/4013 |
| CN | 118041587 A | * | 5/2024 | |
| CN | 111914259 B | * | 7/2024 | H04L 63/1433 |
| CN | 118377461 A | * | 7/2024 | |
| CN | 119597657 A | * | 3/2025 | |
| KR | 102694536 B1 | * | 8/2024 | G06F 21/57 |
| WO | WO-2018118465 A1 | * | 6/2018 | G06F 21/50 |
| WO | WO-2022147478 A1 | * | 7/2022 | G06F 8/60 |

* cited by examiner

FIG. 1

```
[
  {
    Name: ["^(?i)openssl", "^(?i)tinyssl"]
    Version: [[">=1.0", "<=1.1"], [">=2.0", "<=2.2"]]
  }
]
```
200

```
root@root:# ftp 192.168.1.1
Connected to 192.168.1.1
220 ProFTPD 1.3.1 Server (Debian) [::ffff:192.168.1.1]
Name (192.168.1.1:root):
```
202

```
GET /content/../hidden/secret.html HTTP/1.1
Host: 192.168.1.1

HTTP/1.1 200 OK
Server: nginx/1.4.3
Date: Fri, 22 Nov 2013 16:44:32 GMT
Content-Type: text/html
Content-Length: 48
Last-Modified: Fri, 22 Nov 2013 15:28:36 GMT
Connection: keep-alive
ETag: "12345678-90"
Accept-Ranges: bytes
```
204

```
Sbom_software: [
  {
    Tenantid: "1234"
    Deviceid: "aa:bb:cc:dd:ee:ff"
    Software_components [
      {
        Name: "Chrome"
        Version: "60.0.3"
        Source: "HTTP UA"
        Last seen: "2022-12-02T01:15:14"
        Vulnerabilities: ["CVE-2020-12345", "CVE-2020-12346"]
      },
      {
        Name: "Chromium"
        Version: "60.0.3"
        Source: "HTTP UA"
        Last seen: "2022-12-02T01:15:14"
      }
    ]
  }
]
```
208

FIG. 7

SOFTWARE BILL OF MATERIALS AND VULNERABILITY MANAGEMENT VIA DEEP PACKET INSPECTION

BACKGROUND

The disclosure generally relates to electrical digital data processing (e.g., CPC G06F) and security arrangements for protecting computers, components thereof, programs or data against unauthorized activity (e.g., CPC G06F 21/00).

Software bills of materials (SBOM) comprise inventories/catalogs of software components, software component details (e.g., versions), associated vulnerabilities, licenses, risk scores, dependencies, and other data that gives a comprehensive view of software components for an entity such as a device or a software application. An SBOM for a device such as an Internet of Things (IoT) device can sometimes be provided by a vendor of the device to catalog software versions installed on the device. SBOMs are useful for risk management in that software components, versions, dependencies, etc. can be matched with cataloged vulnerabilities such as vulnerabilities enumerated by the Common Vulnerabilities and Exposures (CVE) system to assess risk at a device.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Proliferation of software components installed on devices poses a logistical challenge for maintaining security due to frequent installations and version updates of software components. This challenge is amplified for Internet of Things (IoT) devices that often act as black boxes with little outgoing data regarding executing software components and without security agents to monitor security natively. Systems monitoring security on IoT devices may not receive current software component/component version data to populate SBOM files because this data is sometimes not provided by device vendors. Outdated software component/component version data poses a security risk due to hundreds of thousands of potential vulnerabilities that can correspond to any device type/software component/software component version identifier combination and are frequently updated with new software component versions.

Rather than relying on vendor-provided SBOM files for IoT devices, a SBOM and vulnerability management system ("system") disclosed herein analyzes IoT network traffic with deep packet inspection to detect IoT devices, device types, software components, and software component versions indicated therein. The system parses traffic logs of the IoT network traffic to extract identifiers potentially related to software components according to corresponding application layer protocols. The system then filters, from the extracted identifiers, those identifiers matching blacklisted identifiers that do not correspond to software components. From the filtered identifiers, the system updates a device database with data for each IoT device including software components and component versions. The device database has a schema that is uniform across SBOM file formats which enables the system to populate SBOM files with hardcoded mappings from templates of the uniform schema to various SBOM file formats. Periodically, the system queries a vulnerability database for vulnerabilities present based on software components/component versions in the device database and updates risk scores/assessments for each device accordingly. Extracting software component data from IoT network traffic allows for automated tracking of software components installed on IoT devices and corresponding risk without manually inspecting vendor documentation (e.g., via web scraping vendor websites) or relying on vendor provided SBOM files.

Example Illustrations

Figure 1:
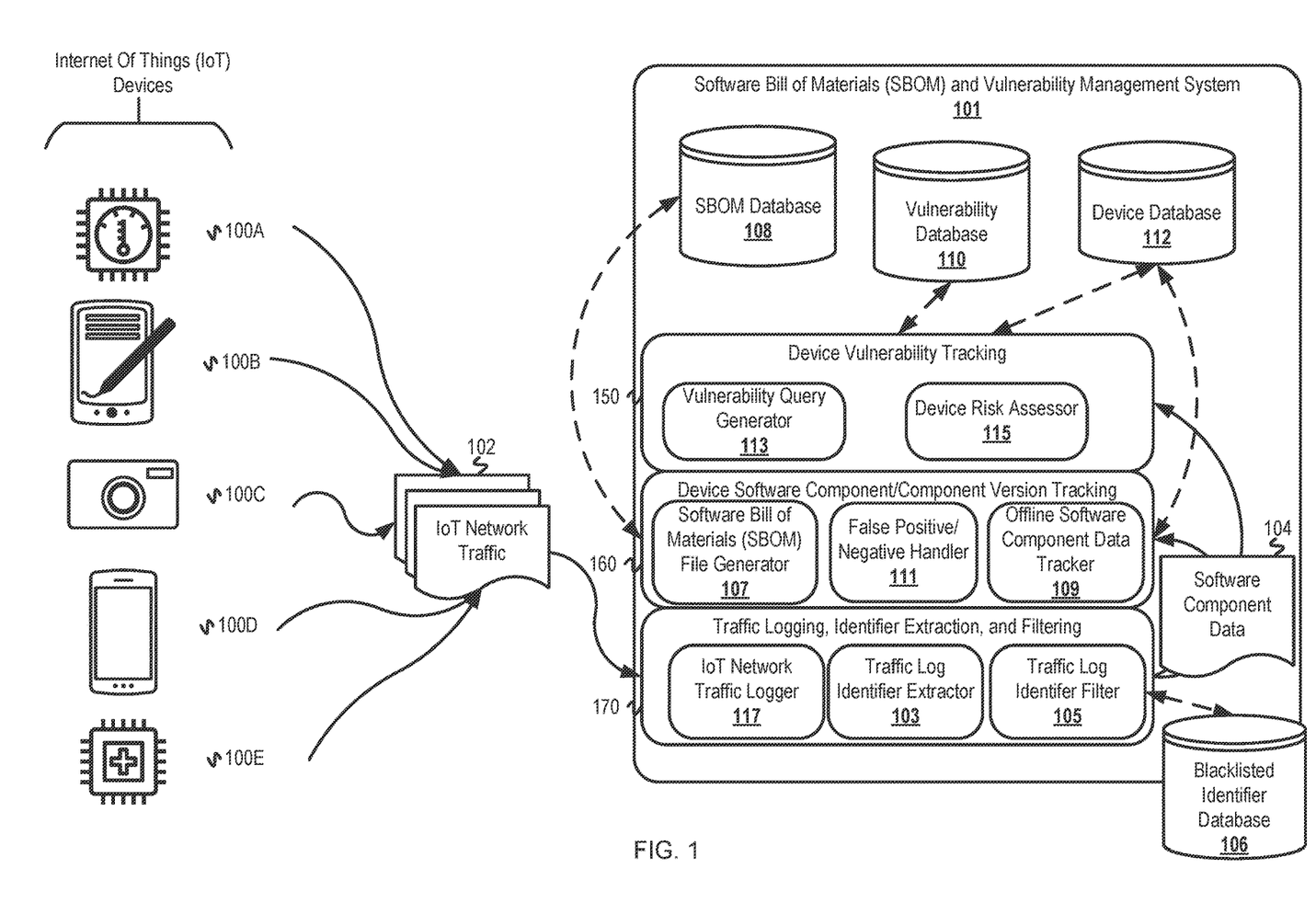
FIG. 1 depicts a schematic diagram of an example system for automated maintenance of SBOM and vulnerability data of IoT devices based on network traffic.

FIG. 1 depicts a schematic diagram of an example system for automated maintenance of SBOM and vulnerability data of IoT devices based on network traffic. A SBOM vulnerability management system ("system") 101 comprises a module 170 for traffic logging, identifier extraction, and filtering, a module 160 for device software component/component version tracking, and a module 150 for device vulnerability tracking. These modules can vary by number and type of components and operate independently according to periodic schedules according to security precautions taken for monitored IoT devices, and multiple components can perform the recited functions within and across modules. For instance, device tracking and vulnerability tracking can occur offline (e.g., daily) whereas traffic logging, identifier extraction, and filtering can occur inline as IoT traffic is monitored. Each module 150, 160, 170 variously interacts with at least a first SBOM database 108 that comprises SBOM files for each IoT device, a vulnerability database 110 that comprises known vulnerabilities and associated metadata, and a device database 112 that tracks device/software component data logged in network traffic.

The modules 150, 160, and 170 can operate independently. For instance, the module 170 can operate online by logging traffic, extracting and filtering identifiers, and storing the filtered identifiers in a database or cache for further analysis by the modules 150 and 160. The modules 150 and 160 can perform operations according to a schedule (e.g., every day) using identifiers accumulated by the module 170 over a previous time period.

The system 101 receives IoT network traffic 102 comprising network traffic from IoT devices such as thermostat 100A, personal digital assistant 100B, camera 100C, smart phone 100D, and medical device 100E (e.g., magnetic resonance imaging or computerized tomography device). The system 101 can execute in the cloud and can receive the IoT network traffic 102 from various firewalls, endpoints, servers, etc. in a centralized database or can be implemented inline for logging and extracting data from network traffic. The module 170 of the system 101 comprises an IoT network traffic logger 117, a traffic log identifier extractor 103, and a traffic log identifier filter 105. As the module 170 logs traffic and extracts and filters identifiers, the module 170 communicates software component data 104 to the modules 150 and 160. The software component data 104 at least comprises device identifiers, device type identifiers, software component identifiers, and software component version identifiers extracted from identifiers of the IoT network traffic 102.

The IoT network traffic logger ("logger") 117 generates traffic logs such as pcap files from monitored network traffic. The logger 117 is implemented at one or more network elements monitoring IoT devices such as a wide area network (WAN) router. The traffic log identifier extractor 103 receives the traffic logs and extracts identifiers that potentially correspond to device/software component data according to application layer protocols of packets of network traffic corresponding to the traffic logs. For instance, the identifiers can comprise strings extracted from protocol headers and protocol payloads, including User-Agent strings, server strings, authentication strings, cookie strings, and request-Uniform Resource Identifier strings. The location of each of these strings and locations of the desired identifiers within each string depend on the corresponding application layer protocol as well as the types of traffic logs generated for each application layer protocol. The traffic log identifier extractor 103 can implement hardcoded rules or regular expressions that indicate or enable the traffic log identifier extractor 103 to extract relevant identifiers. As an example, the traffic log identifier extractor 103 can implement a regular expression that extracts a first string and a second string separated by a "/" character from a server field such as "Server: nginx/1.4.3" in HyperText Transfer Protocol (HTTP), File Transfer Protocol (FTP), and/or Real Time Streaming Protocol (RTSP) headers. In this example, the software component identifier is "nginx" and the software component version identifier is "1.4.3".

The traffic log identifier filter 105 receives extracted identifiers from the traffic log identifier extractor 103 and filters the identifiers to generate the software component data 104. The traffic log identifier filter 105 matches extracted identifiers against a blacklisted identifier database 106 to determine identifiers that do not correspond to software components. For instance, identifiers in the blacklisted identifier database 106 can comprise operating system identifiers, (e.g., Windows® operating system, Linux® operating system), vendor names (e.g., Apple TV®), or keywords irrelevant to software components such as "update", "extension", etc. The blacklisted identifier database 106 can comprise a data structure that stores a list of the blacklisted identifiers, and the traffic log identifier filter 105 can use the Aho-Corasick algorithm with the list in the data structure as the dictionary to match against the extracted identifiers. Any approximate or exact string-matching algorithm can be used. The traffic log identifier filter 105 or other component not depicted in FIG. 1 periodically updates the blacklisted identifier database 106 with additional blacklisted identifiers. The updates can occur based on domain-level expert knowledge of strings appearing in protocol fields from which the fields are extracted that do not correspond to software components, based on querying a public database of identifiers from application layer protocol layers that do not corresponding to software components, etc. Updates occur based on manual review by domain-level experts of software versions/components found on IoT devices. Generating and updating of the blacklisted identifier database 106 can occur asynchronously with respect to filtering identifiers by the traffic log identifier filter 105, for instance as additional identifiers to blacklist are detected by the system 101.

The module 160 receives the software component data 104 and updates the device database 112 and the SBOM database 108 accordingly. Each entry in the device database 112 has a template according to its database schema that stores SBOM data for each IoT device comprising tenant identifiers, device identifiers, software component identifiers, software component version identifiers, sources of the software component data from corresponding application layer protocols, time stamps for last instances recoded of software component on the device, vulnerabilities associated with the software component, risk scores for the device, etc. The template is standardized and allows for mapping fields in the template to each type of SBOM file enabled by the system 101. The offline software component data tracker 109 communicates the software component data 104 to the device database 112 periodically (e.g., every day) for updating entries corresponding to each present device. The device database 112 can be configured to retrieve and update entries corresponding to each device identifier in the software component data 104 if present and otherwise generate a new entry for device identifiers without entries.

Based on a trigger (e.g., a request from a tenant or according to a schedule) to generate SBOM files for one or more devices, the SBOM file generator 107 queries the device database 112 for entries of each device corresponding to each designated SBOM file. The SBOM file generator 107 then populates/updates fields of an SBOM file for each device according to a SBOM file format (e.g., Software Package Data Exchange (SPDX) format, CycloneDX format, Software Identification (SWID) tagging) with corresponding fields in the entries returned by the device database 112 according to a hardcoded mapping for the SBOM file format. Alternatively, the offline software component data tracker 109 and/or the module 170 can communicate the software component data 104 directly to the SBOM database 108, and the SBOM database 108 can generate/update SBOM files accordingly.

The false positive/negative handler ("handler") 111 handles false positive and false negative software components for devices indicated in the software component data 104. For instance, the handler 111 can receive false positive and false negative software component/software component version identifiers from domain-level experts based on manual review and/or from customers providing feedback based on SBOMs generated by the system 101. False positives and false negatives are periodically updated by the handler 111 and used to remove false positive entries and add false negative entries in the databases 108, 110, and 112.

The module 150 comprises a vulnerability query generator 113 and a device risk assessor 115. The vulnerability query generator 113 periodically generates and communicates queries corresponding to each software component indicated in the software component data 104 to the vulnerability database 110. For instance, the vulnerability database 110 can comprise the CVE database and each query can comprise a regular expression specifying ranges of software components and software component versions for software components indicated the device software component data. The vulnerability database 110 returns indications of corresponding vulnerabilities and their metadata. The device risk assessor 115 communicates indications of any returned vulnerabilities to the device database 112 and, optionally, the SBOM database 108 to add to entries of corresponding devices. The device risk assessor 115 can additionally maintain risk scores for each device calculated based on vulnerabilities associated with each device and can update/communicate risk scores to the device database 112 and the SBOM database 108 (alongside corresponding device identifiers). In some instances, none of the software components/component versions have corresponding vulnerabilities in the vulnerability database 110, and the device risk assessor 115 performs no additional operations.

Figure 2:
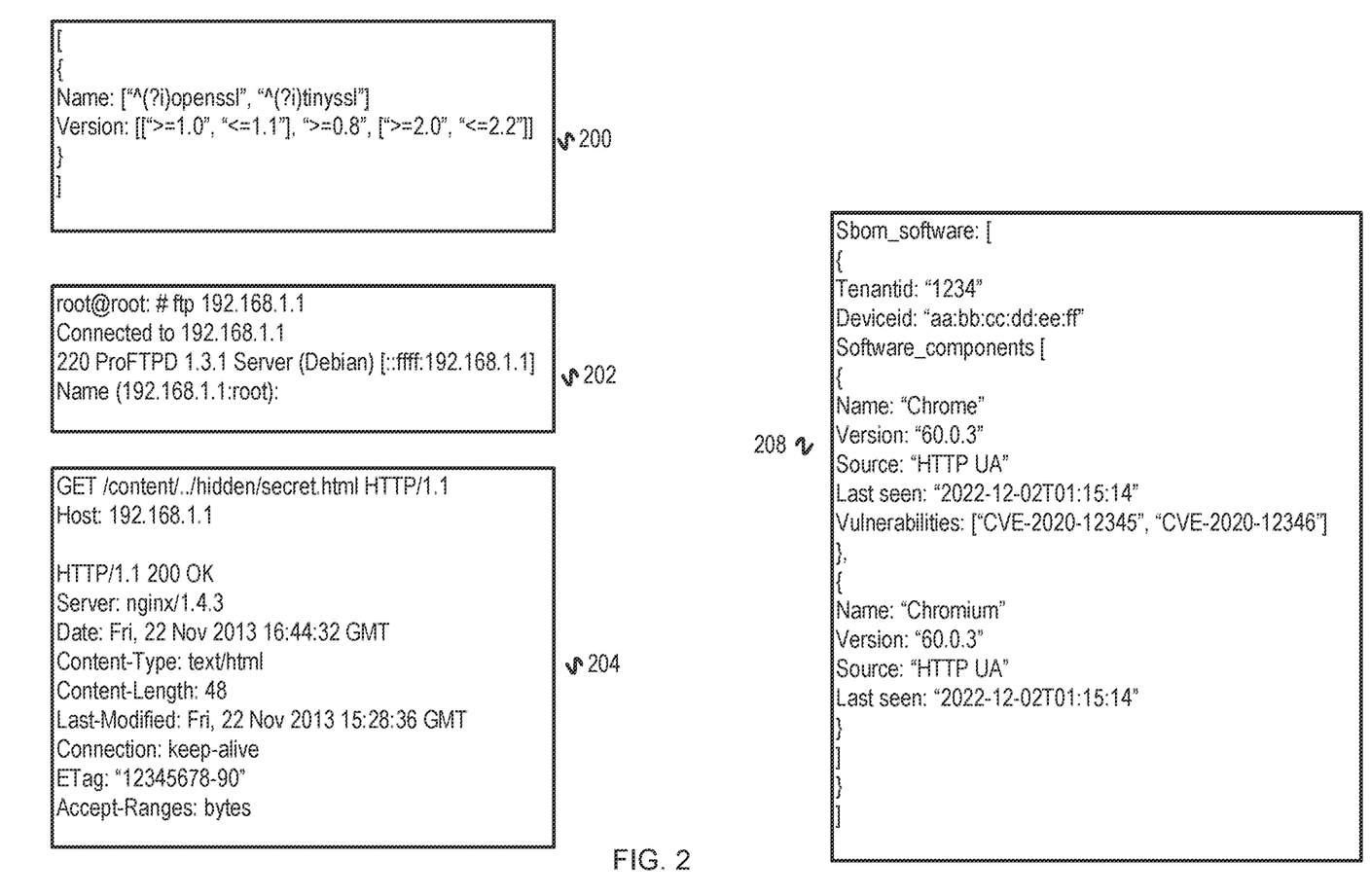
FIG. 2 is a depiction of example queries, database entries, and protocol-based network data for maintaining SBOM files and security for IoT devices.

FIG. 2 is a depiction of example queries, database entries, and protocol-based network data for maintaining SBOM files and security for IoT devices. An example vulnerability database query 200 comprises:

```
[
{
Name: ["`(?i)openssl", "`(?i)tinyssl"]
Version: [[">=1.0", "<=1.1"], [">=0.8", [">=2.0", "<=2.2"]]
}
]
```

The query 200 searches for a software component with an identifier that comprises "openssl" or "tinyssl" and a version between 1 and 1.1, less than 0.8, or between 2.0 and 2.2.

An example FTP response banner 202 comprises:
root@root: #ftp 192.168.1.1
Connected to 192.168.1.1
220 ProFTPD 1.3.1 Server (Debian) [::ffff:192.168.1.1]
Name (192.168.1.1:root):
The banner 202 indicates a 220ProFTPD server software component with version 1.3.1.
An example HTTP response header 204 comprises:
GET/content/../hidden/secret.html HTTP/1.1
Host: 192.168.1.1
HTTP/1.1 200 OK
Server: nginx/1.4.3
Date:Fri, 22 Nov. 2013 16:44:32 GMT
Content-Type:text/html
Content-Length: 48
Last-Modified:Fri, 22 Nov. 2013 15:28:36 GMT
Connection:keep-alive
ETag: "12345678-90"
Accept-Ranges:bytes The header 204 indicates a nginx web server with version 1.4.3.

An example entry 208 in a device database comprises:

```
Sbom_software: [
{
Tenantid: "1234"
Deviceid: "aa:bb:cc:dd:ee:ff"
Software_components [
{
Name: "Chrome"
Version: "60.0.3"
Source: "HTTP UA"
Last seen: "2022-12-02T01:15:14"
Vulnerabilities: ["CVE-2020-12345", "CVE-2020-12346"]
},
{
Name: "Chromium"
Version: "60.0.3"
Source: "HTTP UA"
Last seen: "2022-12-02T01:15:14"
}
]
}
]
```

While the entry 208 resembles an SBOM file, the entry 208 has a generic template comprising fields that can populate an SBOM file of any format. The entry 208 corresponds to a device corresponding to a device "aa:bb:dd:ee:ff" with tenant "1234" and software components with identifiers "Chrome" and "Chromium" as well as fields indicating corresponding versions, sources, time stamps of last detection in network traffic, and/or vulnerabilities for these software components. A software component data tracker (e.g., the offline software component data tracker 109 in FIG. 1) stores hardcoded mappings between fields of entries in a database with a template such as the template of the entry 208 to fields in SBOM files for each SBOM file format and populates SBOM files based on those mappings.

FIGS. 3-6 are example operations for maintaining SBOM files, device data, and vulnerability assessments for various IoT devices using IoT network traffic. The example operations are described with reference to a SBOM and vulnerability management system ("system") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. Various blocks of operations are separated by dashed arrows to indicate that these operations can occur asynchronously according to different schedules and/or be executed by different program components/modules.

Figure 3:
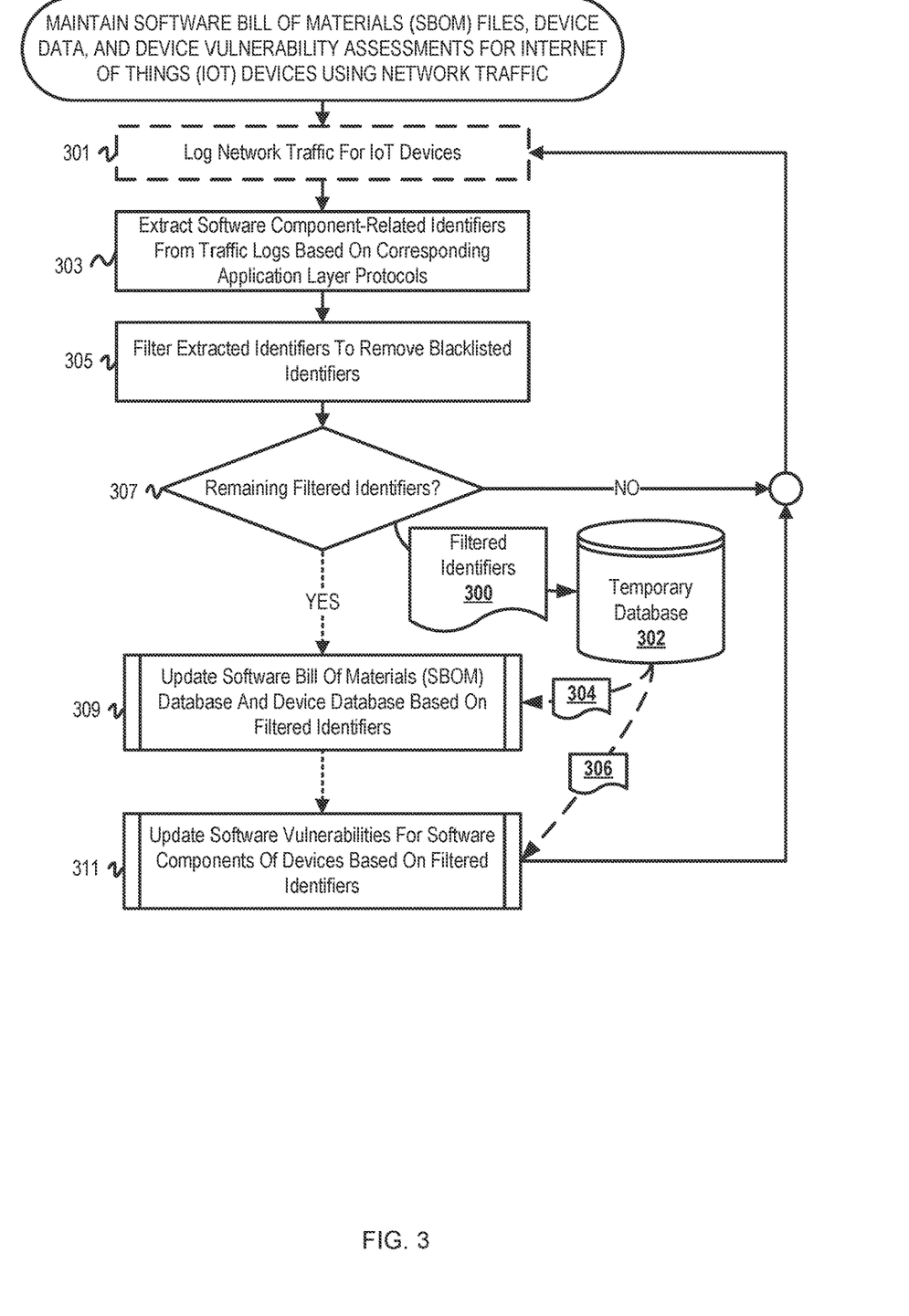
FIG. 3 is a flowchart of example operations for maintaining SBOM files, device data, and vulnerability assessments for IoT devices using network traffic.

FIG. 3 is a flowchart of example operations for building and maintaining SBOM files, device data, and vulnerability assessments for IoT devices using network traffic. At block 301, the system logs network traffic for IoT devices. The system can be implemented at various network elements such as WAN routers externally monitoring and routing network traffic for IoT devices. Various types and formats of traffic logs can be implemented. In some embodiments, traffic logs are collected by the system in a central database or cloud database from various systems logging IoT traffic for analysis. Block 301 is depicted with a dashed line to indicate that logging of network traffic occurs in parallel with the remaining operations in FIG. 3 until an external trigger (e.g., a trigger prompted by an administrator of the system) occurs.

At block 303, the system extracts software component-related identifiers in the traffic logs based on corresponding application layer protocols. The software component-related identifiers can comprise device identifiers, device versions, software component versions, and software component version identifiers. The system can extract the identifiers from protocol headers and protocol payloads including extracting User-Agent strings, server strings, authentication strings, cookie strings, and request-Uniform Resource Identifier strings from corresponding fields in protocol headers and protocol payloads. The extracted identifiers can vary by application layer protocol, and the system can have a predetermined list of strings to extract from protocol headers and payloads specific to each protocol.

At block 305, the system filters the extracted identifiers to remove blacklisted identifiers that do not correspond to software components. The system matches or approximately matches the blacklisted identifiers against the extracted identifiers and removes those identifiers that match. For instance, the system can use the Aho-Corasick algorithm, hash map-based approximate string matching, etc. to match extracted identifiers to blacklisted identifiers. The filtered identifiers are maintained/stored in association with device identifiers for devices that communicated traffic logs from which each of the filtered identifiers was extracted.

At block 307, the system determines whether there are identifiers remaining from the extracted identifiers after filtering at block 305. The system stores remaining filtered identifiers 300 in a temporary database 302. Because the operations at blocks 309 and 311 occur asynchronously to the previous operations in FIG. 3 (as indicated by the separation by dashed arrows), the temporary database 302 can accumulate filtered identifiers 300 from multiple iteration of blocks 301, 303, 305, and 307 prior to blocks 309 and 311 occurring. Accordingly, the filtered identifiers 304 and 306 used at blocks 309 and 311 (indicated by dashed arrows in FIG. 3), respectively, can vary based on corresponding occurrence of these operations. For instance, the filtered identifiers 304 at block 309 can comprise filtered identifiers accumulated over a day whereas the filtered identifiers 306 at block 311 can comprise filtered identifiers accumulated over a week. Moreover, various operations depicted at blocks 309 and 311 can use different subsets of the filtered identifiers 304 and 306, respectively.

At block 309, the system updates a SBOM database and a device database based on the filtered identifiers 304. The operations at block 309 are depicted in further detail FIG. 4.

At block 311, the system updates software vulnerabilities for software components of devices based on the filtered identifiers 306. The operations at block 311 are depicted in further detail FIG. 6. Operational flow returns to block 301.

Figure 4:
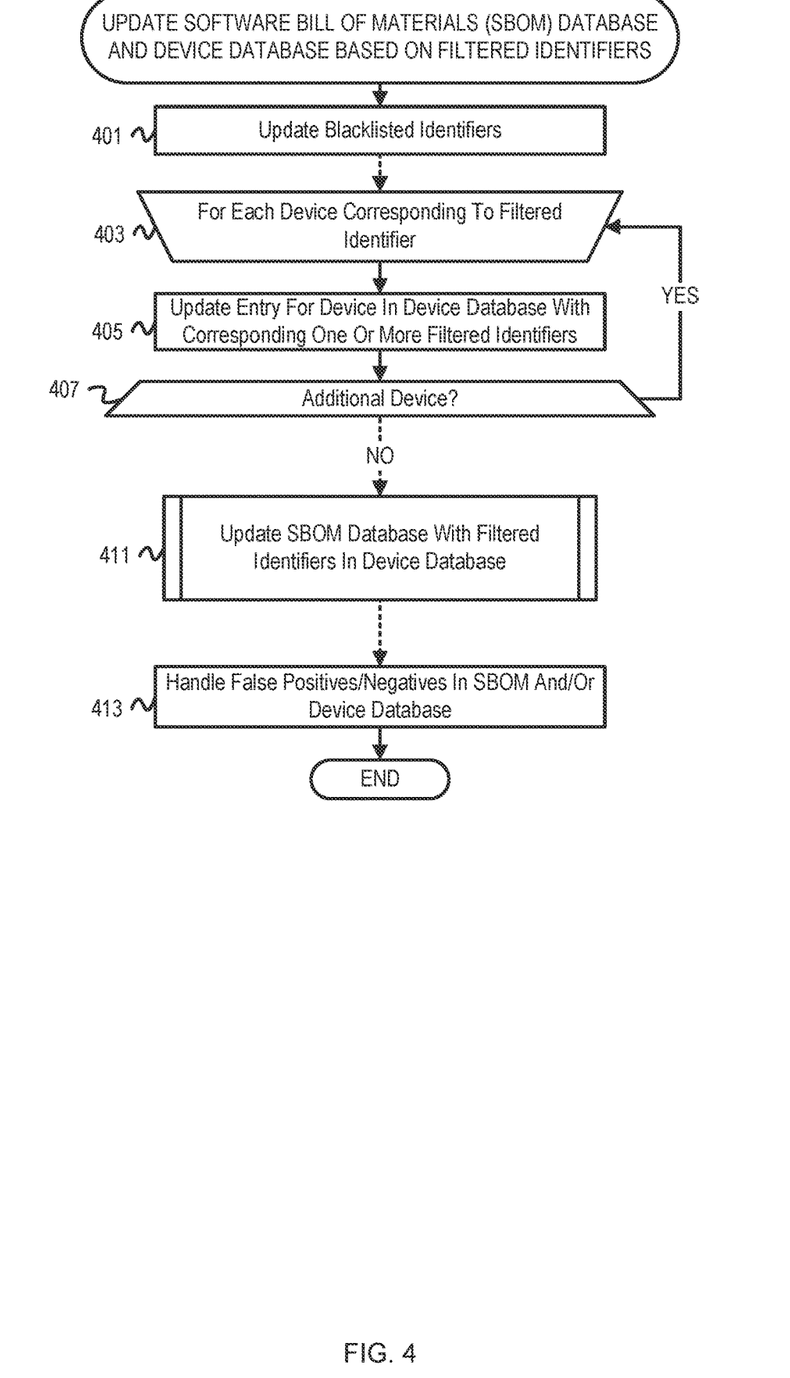
FIG. 4 is a flowchart of example operations for updating a SBOM database and a device database based on filtered identifiers.

FIG. 4 is a flowchart of example operations for updating a SBOM database and a device database based on filtered identifiers. At block 401, the system updates blacklisted identifiers that do not correspond to software components. The system can further filter the filtered identifiers that match any additional blacklist identifiers from the update. Blacklist identifiers can comprise operating system identifiers, vendor identifiers, keywords that are irrelevant to software components, etc. and are periodically updated based on manual inputs by domain-level experts and/or customer feedback based on generated SBOMs.

At block 403, the system begins iterating through devices corresponding to one or more of the filtered identifiers. The system can identify device identifiers corresponding to each filtered identifier and can group the filtered identifiers by device identifier or, alternatively, the filtered identifiers can be priorly stored and maintained in association with indications of corresponding device identifiers.

At block 405, the system updates an entry for the current device in the device database with the corresponding one or more of the filtered identifiers. Each entry in the device database can have a generic template that stores software component-related data such as tenant identifiers, device identifiers, software component identifiers, software component identifiers, vulnerability identifiers, source identifiers, time stamps for when components were last seen/first installed, etc. The template can comprise sub-entries for each software component and the system can generate or update software component sub-entries for each software component with those of the one or more filtered identifiers for the software component.

At block 407, the system determines whether there is an additional device corresponding to one or more of the filtered identifiers. If there is an additional device, operational flow returns to block 403. Otherwise, operational flow proceeds to block 411.

At block 411, the system updates the SBOM database based on filtered identifiers in the device database. The operations at block 411 are depicted in FIG. 4.

At block 413, the system handles false positives and false negatives in the SBOM database and/or the device database. The system receives false positive and false negative software component data from domain-level experts and customers and updates the SBOM database and/or device database by removing false positives and adding false negatives. Handling of false positives and false negatives can occur asynchronously and/or in a separate pipeline from the remaining operations depicted in the flowcharts of the present disclosure. Operational flow in FIG. 4 ends and can proceed to block 311 in FIG. 3.

Figure 5:
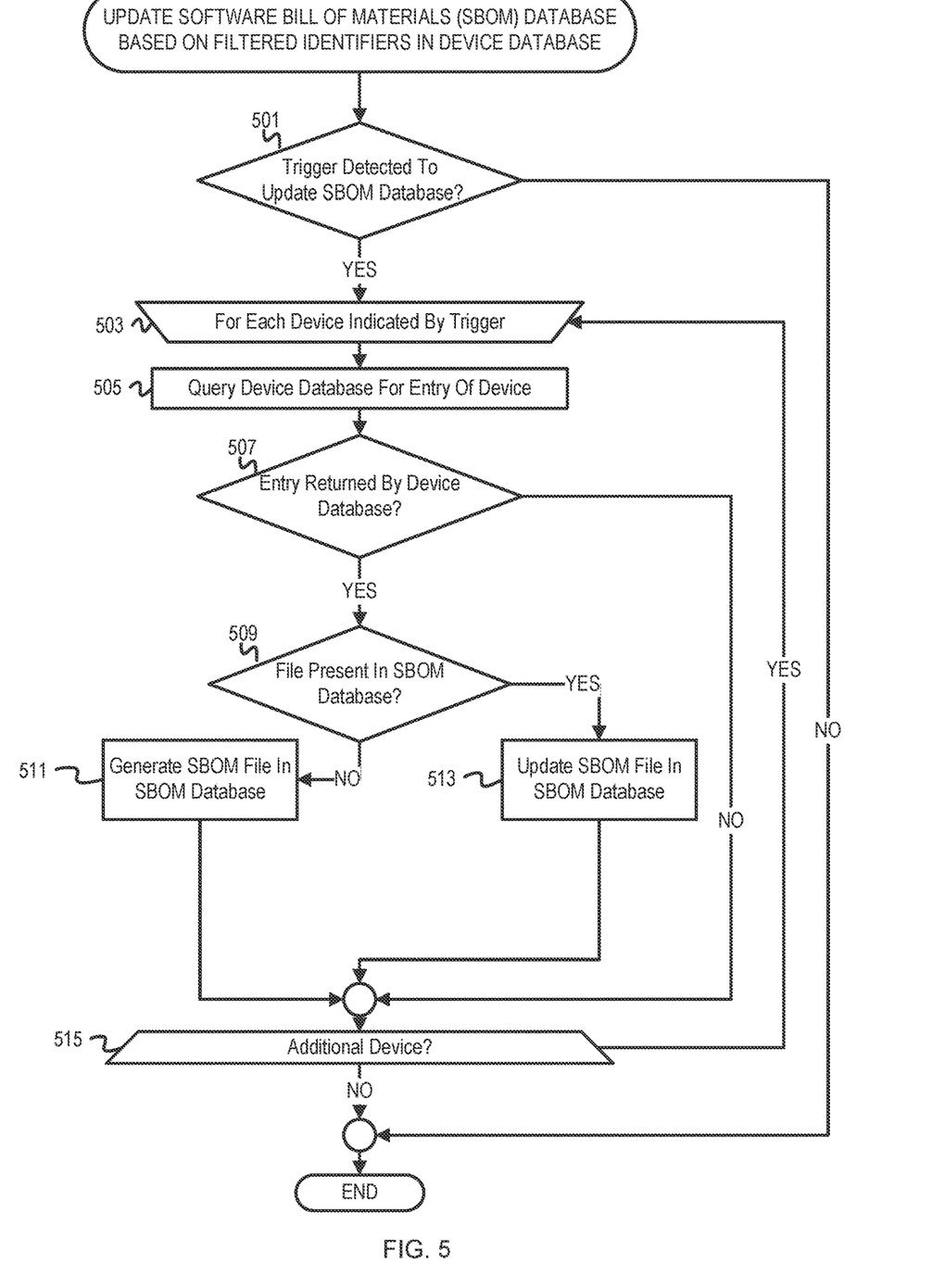
FIG. 5 is a flowchart of example operations for updating a SBOM database based on filtered identifiers in a device database.

FIG. 5 is a flowchart of example operations for updating a SBOM database based on filtered identifiers in a device database. At block 501, the system determines whether a trigger has been detected to update the SBOM database. The trigger can occur according to a schedule (e.g., every day) or be communicated by an external entity such as an administrator of the system. The trigger can indicate an SBOM file format (e.g., SPDX, CycloneDX, SAML) and/or one or more devices for which SBOM files will be generated. In other instances, the trigger indicates to generate/update SBOM files for each device for which filtered identifiers have been stored in the device database over a previous time period (e.g., according to a daily schedule). If there is a trigger detected for updating the SBOM database, operational flow proceeds to block 503. Otherwise, operational flow in FIG. 5 ends and operational flow proceeds to block 413 in FIG. 4.

At block 503, the system begins iterating through devices indicated by the trigger. As in the foregoing, in some embodiments the trigger indicates each device corresponding to one of the filtered identifiers stored in the device database over a previous time period (e.g., a day), and the system can maintain a list of device identifiers corresponding to one or more of the filtered identifiers collected over each time period.

At block 505, the system queries the device database for an entry of the current device, for instance with an identifier of the current device.

At block 507, the system determines whether the device database returned an entry corresponding to the device. If present, the entry has a generic template that can be mapped to any SBOM file format enabled by the system. If the device database returned an entry, operational flow proceeds to block 509. Otherwise, operational flow skips to block 515.

At block 509, the system determines whether there is an SBOM file in the SBOM database corresponding to the current device. If there is an SBOM file, operational flow proceeds to block 513. Otherwise, operational flow proceeds to block 511.

At block 511, the system generates an SBOM file in the SBOM database for the current device. The system can store a hardcoded mapping between fields in the generic template of the entry from the device database and fields in a format of the SBOM file (e.g., the SBOM file format specified by the trigger). The system populates the SBOM file with fields in the entry from the device database based on the mapping. In some instances, the system adds sub-entries in the SBOM file for each software component for the current device and populates fields of each sub-entry according to syntax of the SBOM file format.

At block 513, the system updates an SBOM file in the SBOM database for the current device. The system maps fields in the entry from the device database to the fields SBOM file based on the hardcoded mapping for the SBOM file format, replacing fields that are different from those in the previous SBOM file.

At block 515, the system continues iterating through devices indicated by the trigger. If there is an additional device, operational flow returns to block 503. Otherwise, operational flow in FIG. 5 ends and operational flow proceeds to block 413 in FIG. 4.

Figure 6:
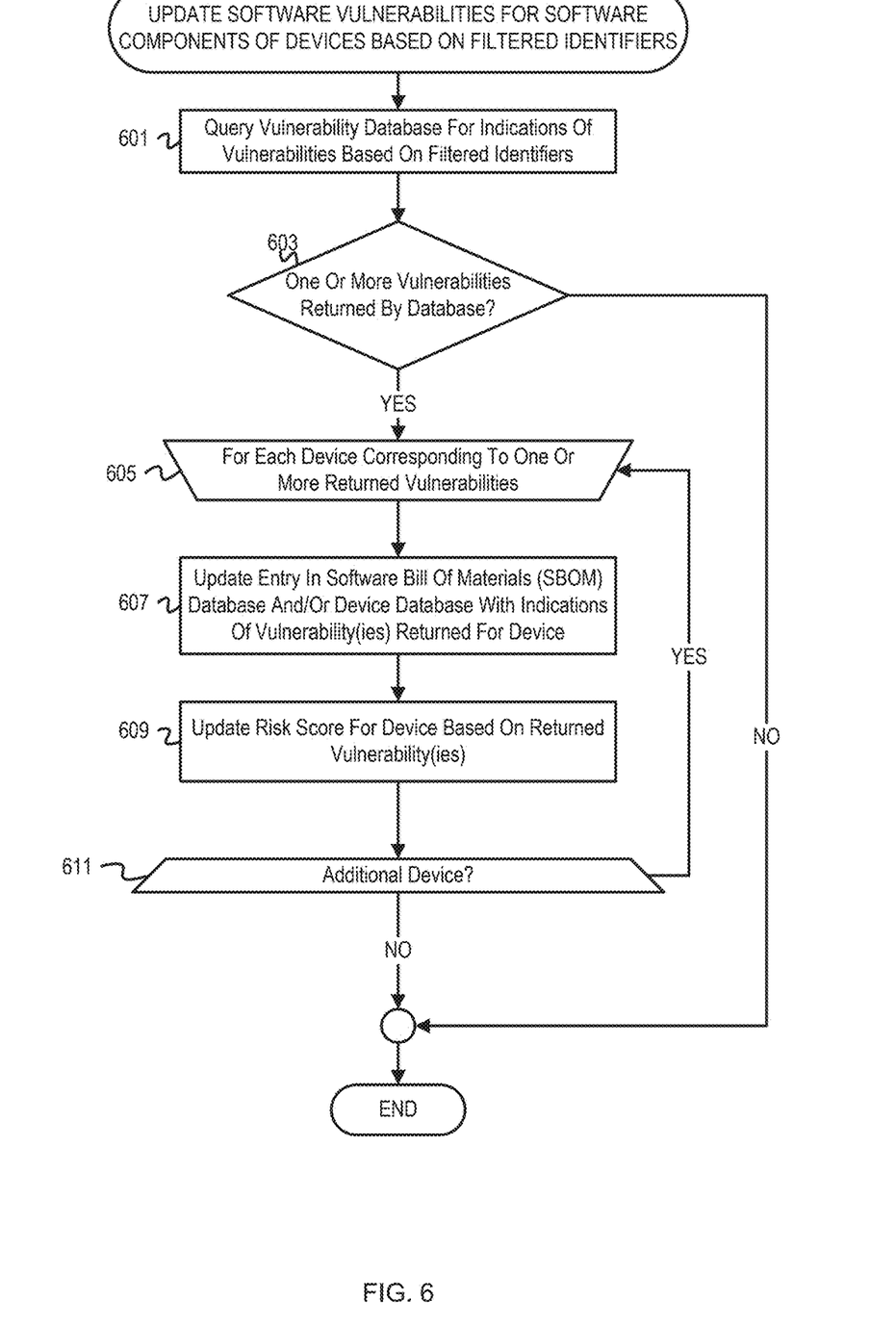
FIG. 6 is a flowchart of example operations for updating software vulnerabilities for software components of devices based on filtered identifiers.

FIG. 6 is a flowchart of example operations for updating software vulnerabilities for software components of devices based on filtered identifiers. At block 601, the system queries a vulnerability database for indications of vulnerabilities based on filtered identifiers. The query can comprise a regular expression that indicates one or more lists of software component identifiers in the filtered identifiers and one or more ranges of software component versions including software component versions indicated in the filtered identifiers. The vulnerability database can comprise a public database of vulnerabilities such as the CVE database and can return metadata for each vulnerability such as corresponding software components/component versions, vulnerability descriptions, risk levels/scores, etc.

At block 603, the system determines whether the vulnerability database returned one or more vulnerabilities. If the vulnerability database returned one or more vulnerabilities, operational flow proceeds to block 605. Otherwise, operational flow in FIG. 6 ends and can proceed to block 301 in FIG. 3.

At block 605, the system begins iterating through devices corresponding to one or more vulnerabilities returned by the vulnerability database.

At block 607, the system updates an entry in a SBOM database and/or a device database for the current device with indications of the vulnerability (ies) returned for the current device. An "entry" as used in reference to the SBOM database refers to an SBOM file for the current device. The system can update the entry in the device and/or SBOM database with identifiers of the one or more returned vulnerabilities as well as indicators of associated risk level (e.g., low, medium high), malicious attack types, threat stages, etc.

At block 609, the system updates a risk score for the current device based on the returned vulnerability (ies). For instance, the system can add a score(s) corresponding to the returned vulnerability (ies) (e.g., a risk score returned by the vulnerability database or a risk score corresponding to the software component on the current device with the vulnerability (ies)). The risk score for the current device can be affected by data from other firewall components that monitor other aspects of IoT devices such as device activity, software-as-a-service applications, etc.

At block 611, the system continues iterating through devices corresponding to one or more returned vulnerabilities. If there is an additional device, operational flow returns to block 605. Otherwise, operational flow in FIG. 6 ends and operational flow proceeds to block 301 in FIG. 3.

Variations

The foregoing description refers variously to "identifiers" when referring to strings extracted from traffic logs of IoT network traffic. Identifiers can alternatively comprise SBOM-related metadata such as time stamps for when a software component was last seen or first installed.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 309 and 311 can be performed in parallel or concurrently. With respect to FIG. 4, updating blacklist identifiers at block 401 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
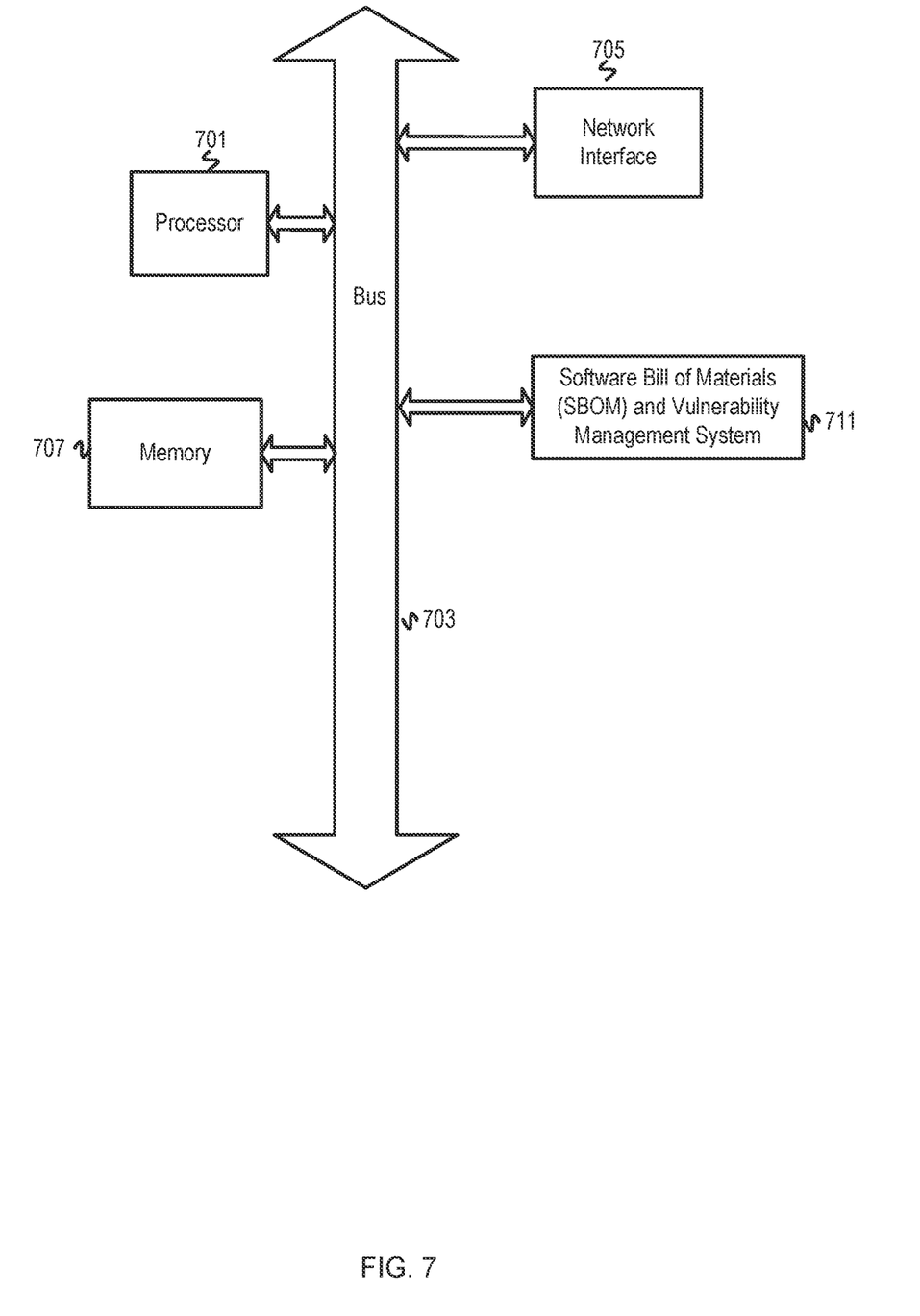
FIG. 7 depicts an example computer system with a SBOM and vulnerability management system.

FIG. 7 depicts an example computer system with a SBOM and vulnerability management system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a SBOM and vulnerability management system ("system") 711. The system 711 extracts software component-related identifiers from IoT network traffic with deep packet inspections and filters the identifiers against a blacklist of identifiers that do not correspond to software components. The filtered identifiers are stored in a device database with a schema that is uniform across SBOM file formats. The system 711 manages and updates SBOM files for the IoT devices by populating fields of the SBOM files with filtered identifiers. The system 711 additionally queries a vulnerability database(s) with parameters of software components on IoT devices identified by the filtered identifiers and updates security risk assessments/scores of the IoT devices according to any returned vulnerabilities. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
   extracting a first plurality of identifiers from network traffic of a first device, wherein at least a subset of the first plurality of identifiers comprises identifiers of at least one of software components and software component versions on the first device;
   filtering, from the first plurality of identifiers, identifiers that match one or more of a second plurality of identifiers to obtain the subset of the first plurality of identifiers that correspond to at least one of the software components and software component version, wherein the second plurality of identifiers comprise identifiers known to not correspond to software components or software component versions; and
   generating a software bill of materials (SBOM) file for the first device based, at least in part, on the subset of the first plurality of identifiers.

2. The method of claim 1, further comprising identifying one or more vulnerabilities corresponding to the first device and one or more corresponding software components indicated in the subset of the first plurality of identifiers.

3. The method of claim 2, further comprising updating one or more risk scores for one or more software components indicated in the subset of the first plurality of identifiers based, at least in part, on the one or more vulnerabilities.

4. The method of claim 1, wherein generating the SBOM file comprises populating fields in a template corresponding to a format of the SBOM file, wherein each of the fields comprises an identifier in the subset of the first plurality of identifiers.

5. The method of claim 1, wherein extracting the first plurality of identifiers comprises parsing traffic logs of the network traffic based on one or more application layer protocols of the network traffic.

6. The method of claim 1, wherein filtering the first plurality of identifiers comprises
   approximate string matching the first plurality of identifiers with the second plurality of identifiers.

7. The method of claim 1, further comprising maintaining a database of device identifiers and associated software component identifiers and software component version identifiers for a plurality of devices comprising the first device, wherein maintaining the database comprises updating the database with the subset of the first plurality of identifiers.

8. The method of claim 1, wherein the first plurality of identifiers comprises identifiers extracted from at least one of protocol header strings and protocol payload strings comprising User-Agent strings, server strings, authentication strings, cookie strings, and request-Uniform Resource Identifier strings.

9. A non-transitory, machine-readable medium having program code stored thereon, the program code comprising instructions to:
   filter a first plurality of identifiers extracted from network traffic of a first device to obtain a subset of the first plurality of identifiers that correspond to at least one of software components and software component versions on the first device; and
   populate fields of a template software bill of materials (SBOM) file for the first device with the subset of the first plurality of identifiers to generate a SBOM file for the first device.

10. The machine-readable medium of claim 9, wherein the program code further comprises instructions to retrieve indications of one or more vulnerabilities corresponding to the first device and one or more software components and software component versions indicated in the subset of the first plurality of identifiers.

11. The machine-readable medium of claim 10, further comprising instructions to update one or more risk scores for one or more software components indicated in the subset of the first plurality of identifiers based, at least in part, on the one or more vulnerabilities.

12. The machine-readable medium of claim 9, wherein the program code further comprises instructions to:
   log the network traffic of the first device to generate traffic logs; and
   extract the first plurality of identifiers from the traffic logs based on one or more application layer protocols of the network traffic.

13. The machine-readable medium of claim 9, wherein the instructions to filter the first plurality of identifiers comprise instructions to,
   approximate string match the first plurality of identifiers with a second plurality of identifiers, wherein the second plurality of identifiers comprises identifiers known to not correspond to software components or software component versions; and
   filter, from the first plurality of identifiers, identifiers that match one or more of the second plurality of identifiers to obtain the subset of the first plurality of identifiers.

14. The machine-readable medium of claim 9, further comprising instructions to maintain a database of device identifiers and associated software component identifiers and software component version identifiers for a plurality of devices comprising the first device, wherein the instructions to maintain the database comprise instructions to update the database with the subset of the first plurality of identifiers.

15. An apparatus comprising:
   a processor; and
   a machine-readable medium having instructions stored thereon that are executable by the processor to cause the apparatus to,
   parse traffic logs of network traffic of a plurality of devices to extract a first plurality of identifiers, wherein at least a subset of the first plurality of identifiers comprises at least one of software component identifiers and software component version identifiers of software components on one or more of the plurality of devices;
   filter, from the first plurality of identifiers, identifiers that match one or more of a second plurality of identifiers to obtain the subset of the first plurality of identifiers wherein the second plurality of identifiers comprises identifiers known to not correspond to software components or software component versions; and
   populate fields of one or more software bill of materials (SBOM) files for one or more of the plurality of devices with the subset of the first plurality of identifiers.

16. The apparatus of claim 15, further comprising instructions executable by the processor to cause the apparatus to query a database of software vulnerabilities for vulnerabilities corresponding to software components and software component versions indicated in the subset of the first plurality of identifiers and corresponding devices in the plurality of devices.

17. The apparatus of claim 15, wherein the instructions to parse the traffic logs of network traffic of the plurality of devices comprise instructions executable by the processor to cause the apparatus to parse the traffic logs of network traffic based on one or more application layer protocols of the network traffic.

18. The apparatus of claim 15, wherein the instructions to filter the first plurality of identifiers comprise instructions executable by the processor to cause the apparatus to
   approximate string match the first plurality of identifiers with a second plurality of identifiers.

19. The apparatus of claim 15, further comprising instructions executable by the processor to cause the apparatus to maintain a second database of device identifiers and associated software component identifiers and software component version identifiers for at least the plurality of devices, wherein the instructions to maintain the second database comprise instructions executable by the processor to cause the apparatus to update the second database with the subset of the first plurality of identifiers.

20. The apparatus of claim 15, wherein the first plurality of identifiers comprises identifiers extracted from at least one of protocol header strings and protocol payload strings comprising User-Agent strings, server strings, authentication strings, cookie strings, and request-Uniform Resource Identifier strings.

* * * * *